United States Patent [19]
Sidhu et al.

[11] Patent Number: 5,884,322
[45] Date of Patent: Mar. 16, 1999

[54] METHOD AND APPARATUS FOR CREATING AND ASSIGNING UNIQUE IDENTIFIERS FOR NETWORK ENTITIES AND DATABASE ITEMS IN A NETWORKED COMPUTER SYSTEM

[75] Inventors: Gursharan S. Sidhu, Menlo Park; Shantanu Narayan, Sunnyvale; Mark A. Gealy, Palo Alto; Richard F. Andrews, Menlo Park; Susan A. Manning, Boulder Creek, all of Calif.

[73] Assignee: Apple Computer, Inc., Cupertino, Calif.

[21] Appl. No.: 687,677

[22] Filed: Jul. 26, 1996

Related U.S. Application Data

[63] Continuation of Ser. No. 248,130, May 24, 1994, abandoned.

[51] Int. Cl.[6] .................................................. G06F 17/30
[52] U.S. Cl. ........................ 707/200; 707/10; 707/100; 395/200.3; 395/200.75
[58] Field of Search ........................... 395/610, 611, 395/616, 200.3, 200.31, 200.75; 707/200, 10, 100

[56] References Cited

U.S. PATENT DOCUMENTS

| | | | |
|---|---|---|---|
| 4,792,921 | 12/1988 | Corwin | 364/DIG. 2 |
| 4,851,988 | 7/1989 | Trottier et al. | 364/DIG. 1 |
| 4,914,571 | 4/1990 | Baratz et al. | 364/DIG. 1 |
| 5,185,860 | 2/1993 | Wu | 364/DIG. 1 |
| 5,191,650 | 3/1993 | Kramer et al. | 364/DIG. 1 |
| 5,224,205 | 6/1993 | Dinkin et al. | 364/DIG. 1 |
| 5,357,630 | 10/1994 | Oprescu et al. | 395/600 |
| 5,377,323 | 12/1994 | Vasudevan | 364/DIG. 1 |
| 5,649,194 | 7/1997 | Miller et al. | 395/616 |

FOREIGN PATENT DOCUMENTS

0661652 A1   5/1995   European Pat. Off. .

*Primary Examiner*—Thomas G. Black
*Assistant Examiner*—Hosain T. Alam
*Attorney, Agent, or Firm*—Helene Plotka Workman

[57] ABSTRACT

Unique identifications are assigned to entities in a network and items in a database. In general, unique identifications are assigned to entities or data items within a network by a plurality of server entities, each server entity capable of obtaining a unique subset of identifications from other server entities, assigning an identification from its subset to another server entity, subdividing its own subset to form other unique subsets and assigning a unique subset to another server entity. Each server entity receives its own server entity identification when it is installed and also may request to receive a unique subset of entity identifications. A subset of entity identifications, also referred to interchangeably herein as a "block" of entity identifications, comprises one or more entity identifications. Each server entity controls the assignment of the entity identifications within the subsets it receives. When items such as records or attributes within records are created in a server's database, the server entity generates a unique sequence identification which it combines with its entity identification to create a unique item identification.

18 Claims, 10 Drawing Sheets

METHOD AND APPARATUS FOR CREATING AND ASSIGNING UNIQUE IDENTIFIERS FOR NETWORK ENTITIES AND DATABASE ITEMS IN A NETWORKED COMPUTER SYSTEM

This is a continuation of application Ser. No. 08/248,130, filed May 24, 1994, now abandoned.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

This invention relates generally to computer systems in a networked environment and, more specifically, to a method and apparatus for generating unique identifiers for network entities and items of data in a networked computer system.

BACKGROUND OF THE INVENTION

In version 3.2 of the Macintosh operating system and subsequent versions, distributed by Apple Computer, a mechanism in the file system issues identifications for file structures, such as, for example, folders and files, which are unique within the file system of a particular computer. In this file system, called the Hierarchical File System, a newly-created file structure is assigned an identification which is based on the value of a counter. The counter is initialized and incremented with respect to each assignment of an identification to a file structure. However, the mechanism in the Macintosh operating system is not designed to handle a network of computer systems. The file system of the Macintosh operating system is described in "Inside Macintosh, Volume IV, Chapter 19, Addison-Wesley Publishing Co., 1986 and "Inside Macintosh: Files", Addison-Wesley Publishing Co., 1992.

A networked computer system comprises one or more network entities such as computers, printers, servers, routers, users, gateways, processes, tasks, communication points, etc. The term "server" is used herein to denote any computer or software application which responds to a request of another computer or software application. The term "client" is used to denote an initiator of a request, either a user or a computer device, while server is used to denote an acceptor of that request.

Each entity may be described by one or more storage records, herein referred to as "records", each record containing items of information which pertain to that entity. For example, if the entity is a printer entity, then corresponding records may contain a name, an electronic address and paper size information.

Generally, in a networked computer system having a very large number of entities, a structure including one or more groupings of entities is maintained. The organizational model of this structure varies from system to system or from networked computer system to networked computer system.

In some systems the structure is organized in a hierarchical format, containing logical groupings of entities called catalogs. Each catalog may contain one or more subordinate catalogs, herein referred to as sub-catalogs, thereby permitting structures of varying depths. Records for a network entity may be included in one or more catalogs.

Typically, it is desirable for each entity and each of its records on the network to have a unique identification because ambiguities may arise when two or more entities or records have the same identification. For example, if two entities have the same identification and a third entity sends a communication over the network specifying that identification, it is unclear which entity is the intended recipient of the communication. Likewise, if a user is attempting to access a particular record and two or more records have the same identification, then, in the absence of other information, it is unclear which record to access. Thus, to avoid ambiguities, it is preferable for each entity and record in a networked computer environment to have a unique identifier.

Unique identifiers are discussed generally in "Distributed Systems—Architecture and Implementation", Chapter 9, B. W. Lampson, Springer-Verlag Berlin Heidelberg, 1981, and "Distributed Systems", Chapter 12, Addison-Wesley Publishing Co., 1993. The former describes unique identifiers having a structure with two components: a server identifier and a unique local identifier. The unique local identifier is unique within the domain of the server identifier. It is suggested that the server identifier is an address of a server.

In some networked computer systems, such as the Xerox Network Systems products, an identifier is created by concatenating a time stamp with an Ethernet host identifier. Xerox Network Systems is a trademark and Xerox is a registered trademark of Xerox Corporation. The time stamp includes the date and time, including seconds. An Ethernet card typically includes a unique identification assigned at manufacturing time. This technique has several drawbacks however. First, it includes a hardware limitation in that each server entity generally has to include an Ethernet card. Second, the technique depends upon ensuring that the internal clock does not move backwards or stop and that more than one identifier is not issued during a single second, thereby possibly reusing a time stamp. Thus, timing servers and other precautions are used to attempt to keep the timing in sync and to keep the timing hardware and software operating. Typically, the system keeps track of the last time stamp issued and checks that the next time stamp issued is chronologically later.

In some networked computer systems, records are identified by character strings which bear some relationship to the information stored in the record. For example, in a database where each record corresponds to an individual user, the identification of a record might be the name of the user. However, two or more users may have the same name, thereby creating ambiguities. Moreover, when a user changes his or her name, the corresponding item identification is changed.

Several methods can be used to generate unique identifications for entities in a networked computer system. In some networked computer systems, one or more persons act as administrators and assign a unique number to each server for each domain. However, this system can be tedious and is vulnerable to human error.

The system can be tedious because an entity or its representative contacts human personnel to receive an identification. The human personnel uses a list, computerized or manual, in order to derive an identification to assign to the entity.

Human error may cause the same identification to be assigned to two or more entities. In a situation where two or more administrators assign identifications using a common list of identifications, a breakdown in contact, either through miscommunication or a shutdown of the communications system, can result in two or more administrators assigning the same number to two or more different entities. If the entities embed these identifications in their records, it can be difficult to correct the error, if and when the error is discovered.

Rather than assigning identifiers using human administrators, a central server, herein called a "seed server" can be used. The use of a central unique identifier generator is suggested in "Distributed Systems—Architecture and Implementation" at page 195.

In networked systems which employ a seed server method there is a risk of bottleneck because there is a single source for assigning identifications in the system. Additionally, if the seed server is unreadable, unreachable or otherwise unable to effectively assign an identification when a new server is installed in the network system, an operator generally intervenes to handle the installation of the new server. When the seed server subsequently becomes available it is updated with the information about the servers which were installed during that inoperative or problematic period. A discrepancy or error related to the updating of the seed server, could potentially result in the same identification being assigned to two different servers.

SUMMARY OF THE INVENTION

Briefly, according to the invention, unique identifications are assigned to entities in a network and items in a catalog or other database. These identifications are referred to collectively herein as "entity identifications". The term "server entity identification" is used to denote an entity identification for a server entity, while the term "item identification" is used to denote an entity identification for other entities or items in the database. In a first embodiment of the invention, unique identifications are assigned to available entities and data items within a network by a plurality of server entities, each server entity capable of obtaining a unique subset, i.e. range, of identifications from other server entities, assigning an identification from its subset to another server entity, subdividing its own subset to form other unique subsets and assigning a unique subset to another server entity. Each server entity receives its own server entity identification when it is installed and may also request to receive a unique subset of entity identifications. A subset of entity identifications, also referred to interchangeably herein as a "block" of entity identifications, comprises one or more entity identifications. Each server entity controls the assignment of the entity identifications within the subsets it receives.

The size of an assigned subset of unique identifications can be fixed or arbitrarily requested. For example, upon receipt of a request for a subset of unique identifications, a server entity may assign a fixed percentage of its block of unique identifications, e.g. 10%, 25%, 50%, or it may assign a fixed number of unique identifications, e.g. 10, 50, 100, 1000. However, in some cases, some server entities are contacted for identifications more frequently than other server entities. In a situation where a server entity controls substantially more identifications than it assigns, identifications may remain unused for lengthy periods of time. Depending on the size of the system, this may or may not be a problem.

In some cases, since the frequency of server entity contacts is not necessarily uniform across the system, it is desirable to permit a server entity to request a subset containing a specific number or percentage of identifications. For example, a server entity which expects to receive many contacts may request a subset of 100 identifications, while a server entity which expects to receive only a few contacts may request a subset of 10 entities. A server entity may later request further subsets of identifications as appropriate. Thus, the number of identifications owned by a server entity can more closely approximate the number of requests for identifications received by that server entity.

The invention can include a mechanism for a server initiating an assignment of identifications to other servers. This mechanism is particularly useful when a server has more identifications than it will likely use. This determination can be based on past use of identifications. In that case, the server can assign all of its identifications or a portion thereof to another server, preferably one which is more likely to use the identifications. This mechanism provides a means for appropriating identifications in a manner which is consistent with network use, thereby reducing the number of identifications that remain dormant because of inactivity on the server which owns those identifications.

In a second embodiment, according to the invention, a server entity, designated as a master server entity, controls the assignment of identifications to other server entities. When a server entity is installed, it contacts the master server entity and receives a unique identification.

Preferably, the second embodiment includes a mechanism for transferring the designation of master server entity from one server entity to another server entity. This transferring mechanism is particularly useful to avoid a bottleneck or significant slow down of the server entity identification assigning process when the master server entity is being subjected to heavy use. Moreover, the transferring mechanism can be used when reconfiguration of the network system results in the master server entity being physically located in a remote or otherwise undesirable location.

The transferring mechanism permits the master server designation to be changed in a way which substantially reduces the risk of error, e.g. the assignment of the same server entity identification to two or more server entities, associated with such operator intervention.

The first and second embodiments are each advantageous in that unique identifications are created and assigned to entities in a network of computer systems.

The first embodiment presents several other advantages as well. First, by allowing multiple server entities to assign identifications, the first embodiment reduces the risk of a bottleneck. When a server entity identification is to be assigned, it is likely that at least one of the multiple server entities will be available to perform the operation. Thus, it is unlikely that heavy use of one or more of the server entities will significantly slow down the process of assigning server entity identifications. The system may also include a mechanism for evenly distributing the use of the assigning server entities to further reduce the risk of bottleneck.

Second, in the first embodiment, if there are two or more assigning server entities, then the process of assigning unique server entity identifications can continue, without operator intervention, even though a particular assigning server is unreadable, unreachable or otherwise unable to effectively assign a server entity identification. Thus, the first embodiment reduces the likelihood that the malfunctioning of a particular server entity will negatively impact the process of assigning unique server entity identifications.

In any of the above-described mechanisms embodying the invention where a unique identifier is appropriate, the server entity generates a unique sequence identification which it combines with its entity identification to create a unique item identification. As an example, when items such as records or attributes within records are created in a server's database, a unique identification is assigned to each record or attribute. An item identification for a record is also called a record identification, while an item identification for an attribute within a record is also called an attribute identification. The terms item identification, record identification and attribute identification are used interchangeably throughout the following description. Preferably, the server entity concatenates the sequence identification onto the end of the entity identification to form the item identification.

More specifically, the assignment of unique identifications to entities within a system and/or catalog is accomplished in the following manner, unless a master server entity is used. The first server entity installed in the system is assigned an initial entity identification and is given control/ownership of the whole set of other entity identifications. When a second server entity is installed, it contacts the first server entity which assigns it an entity identification. The second server entity can also negotiate with the first server entity to receive a subset of entity identifications from those which the first server entity still controls/owns.

An assigning server entity does not control/own entity identifications which it assigns to another server entity, either singly or in a subset. Rather, ownership of assigned entity identifications, or blocks thereof, is transferred to the assignee, i.e. the receiving server entity. Servers which are subsequently installed can contact any previously installed server entity which has a block/subset of entity identifications to assign. If one or more server entities are not operating or can not effectively assign entity identifications, then there will typically be other fully operating servers which can effectively assign entity identifications. Thus, a system incorporating the invention is unlikely to encounter bottlenecks and reduces the likelihood of a single point of failure because there can be multiple copies of a catalog and if one server entity is down, then another server entity with a copy of that same catalog can be contacted. Since it is likely that at least one server entity capable of assigning entity identifications will be operating when a new server entity is installed, the invention reduces the use of administrators and installers and the errors caused thereby. Although the term "server entity" is used in this description, the invention can be equally applied to other entities, for example a workstation creating unique file identifications.

To create unique identifications for items within its catalog, a server generates for each newly-created item a sequence number which is unique to that server. The server then combines its entity identification with the sequence number to form a unique item identification for the newly-created item. Since an item identification created using the invention is not specifically linked to any of the other attributes or characteristics of that item, it does not have to be changed when an attribute is changed. Thus, for example, when a user changes his or her name, that user's item identification does not have to change.

The entity identification and the sequence identification preferably convey no meaning other than as unique values. Preferably, the identifications are integers because integers have compact storage representations. Thus, the amount of time spent recognizing and/or matching the identifications is less for integers than other data types such as character strings.

The invention can be used on any type of database having any kind of internal structure. For example, the database can be distributed or non-distributed, hierarchical or non-hierarchical. In distributed or networked systems there can be steady, i.e. persistent, reliable and expected, or transient, i.e. occasional, contact between nodes in the system. In these distributed or networked systems there can also be no direct contact between particular nodes. For example, information can be transferred from a first node to a second node via some intermediary device. In addition, the invention is not limited to catalog-based systems and can be used in any kind of system in which devices cooperate to produce unique identifications.

BRIEF DESCRIPTION OF THE DRAWINGS

The above and further advantages of the invention may be better understood by referring to the following description in conjunction with the accompanying drawings, in which.

DETAILED DESCRIPTION OF THE DRAWINGS

Figure 1:
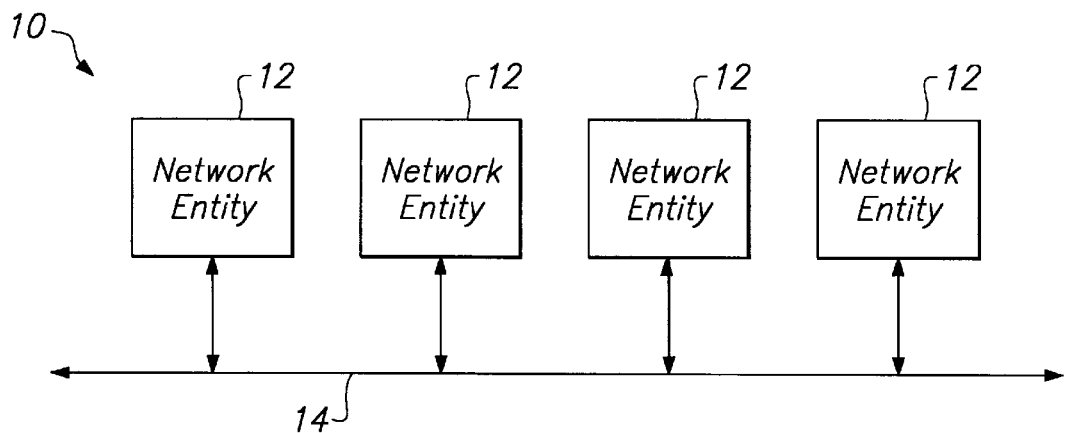
FIG. 1 is a simplified block diagram of a network of computer systems which may incorporate the invention.

FIG. 1 shows a computer network system 10 comprising one or more network entities 12 interconnected via a network 14.

A network entity 12 is a device on a computer network. Such devices are, for example, computers, servers, printers, routers, gateways, mail servers, database servers, or other devices which input, output or otherwise manipulate data.

The network 14 can be any kind of network architecture connected by permanent or transient router links. For example, the network 14 can be a local-area network, high-speed bus or other interconnecting mechanism for exchanging messages and data, such as LocalTalk, Ethernet, ISDN, Token Ring, cellular telephones, satellite communications, cable TV, fiber optic connections, or other interconnecting mechanism which provides communication at a distance between two or more entities. LocalTalk is a registered trademark of Apple Computer, Inc. The network can include routers and can be disjoint, i.e. have transient or no communication between devices on the network.

Figure 2:
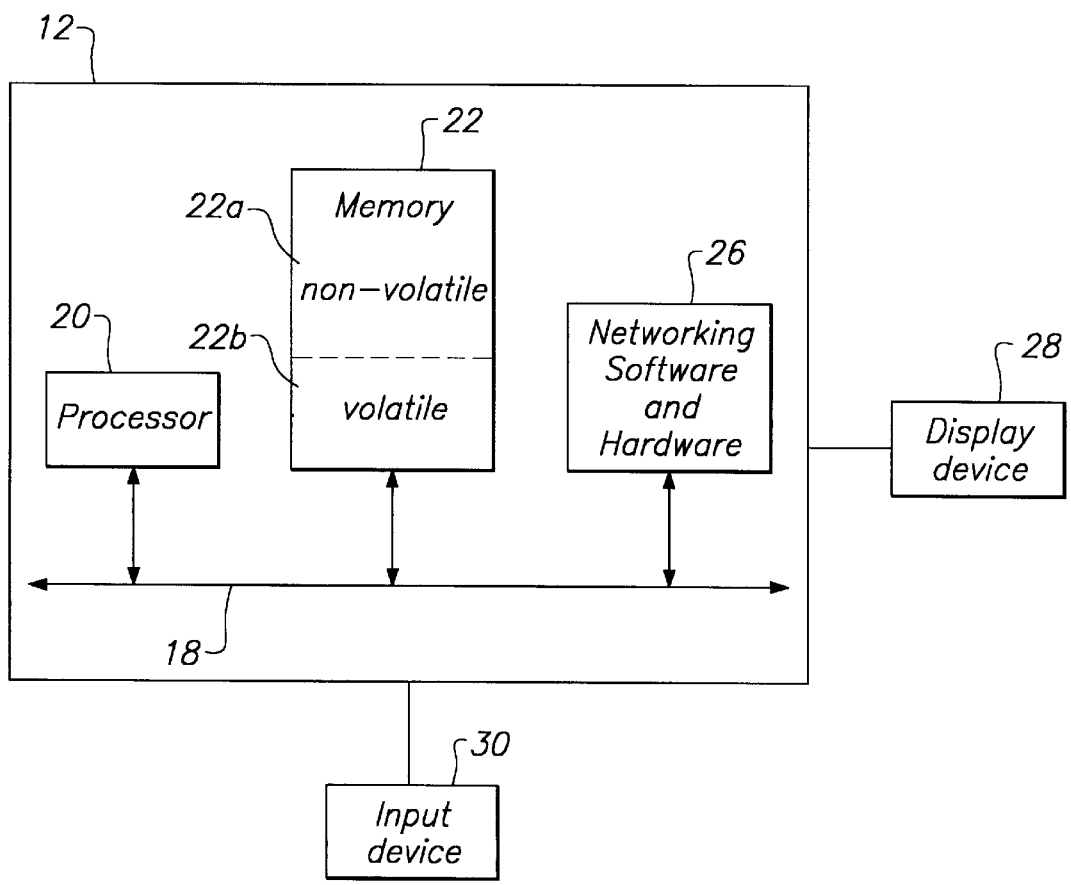
FIG. 2 is a simplified block diagram of a network entity of the network of computer systems of FIG. 1.

FIG. 2 shows a network entity 12. Typically, a network entity 12 has a system bus 18 interconnecting a processor 20, a memory 22 and a networking module 26. The processor 20 is typically a central processing unit ("CPU") or other microprocessor. The memory 22 typically includes non-volatile memory 22a and volatile memory 22b. Non-volatile memory 22a is generally a hard disk. Volatile memory 22b is generally random access memory, "RAM". Optionally, the network entity 12 can include a display device 28 and an input device 30. The display device 28 can be a monitor, printer or other device. The input device 30 can be a keyboard, pen and tablet, scanner, speech recognition unit, or other device capable of sending input to the network entity.

The networking module 26 includes software and hardware for connecting the network entity 12 to a network 14 (FIG. 1) and for communicating with other network entities over the network. On some network entities the networking module 26 includes network-wide software or services. The network module 26 includes software or services incorporating the invention. More specifically the network module 26 contains a mechanism for providing communication, e.g. a network transceiver, a mechanism for performing general arithmetic functions, and a mechanism for data storage and retrieval. Network module 26 interoperates with the processor 20 and memory 22 to provide network services.

An example of a network-wide service is that which is provided by the PowerShare Catalog Server application, available from Apple Computer, Inc. and herein referred to as "PCS". PowerShare is a trademark of Apple Computer, Inc. PCS is a general-purpose, network system-wide, catalog service which maintains a shared repository for collaborative information such as employee databases and corporate directories. It can also be used to store common user profile information and information needed to manage workflow processes and to communicate important information between software applications.

The catalog services of PCS provide access to a database containing records which contain various items of information about or attributes of network entities 12. A network entity 12 may have one or more corresponding records in the database. For example, users of a network entity may each have a corresponding record containing attributes describing the user's various electronic mail accounts.

PCS permits the construction of very large catalogs, serving systems which can range in size from a few to many hundreds of thousands of users. It allows for a hierarchical structuring of the catalogs. For example, the structuring of a catalog of a company may be geographically organized. In that case, the catalog of a company generally includes a plurality of regional catalogs, each corresponding to a particular geographic region. Each of those regional catalogs in turn typically includes a plurality of site catalogs, each corresponding to a particular corporate site. In another example, the catalog of a company may be arranged according to the various organizations within the company. In that case, the catalog for the company contains a plurality of organization catalogs, one for each high-level organization within the company. Each organization catalog can contain one or more sub-organization catalog, each representing a group within that organization, or a list of members of that organization. Each sub-organization catalog can be similarly subdivided or enumerated. The structure can be virtually any depth, depending on the organization of the company.

The database for a catalog is stored on one or more PCS server entities. If a catalog is served by more than one server entity, each of the servers maintains a substantially equivalent copy of the same catalog database.

The PCS system is just an example of a database system which can incorporate the invention. The invention is generally applicable to any database system and any network system.

In a first embodiment of the invention, server entity identifications can be assigned by one or more server entities. In a second embodiment of the invention, a master server entity assigns server entity identifications.

Figure 3:
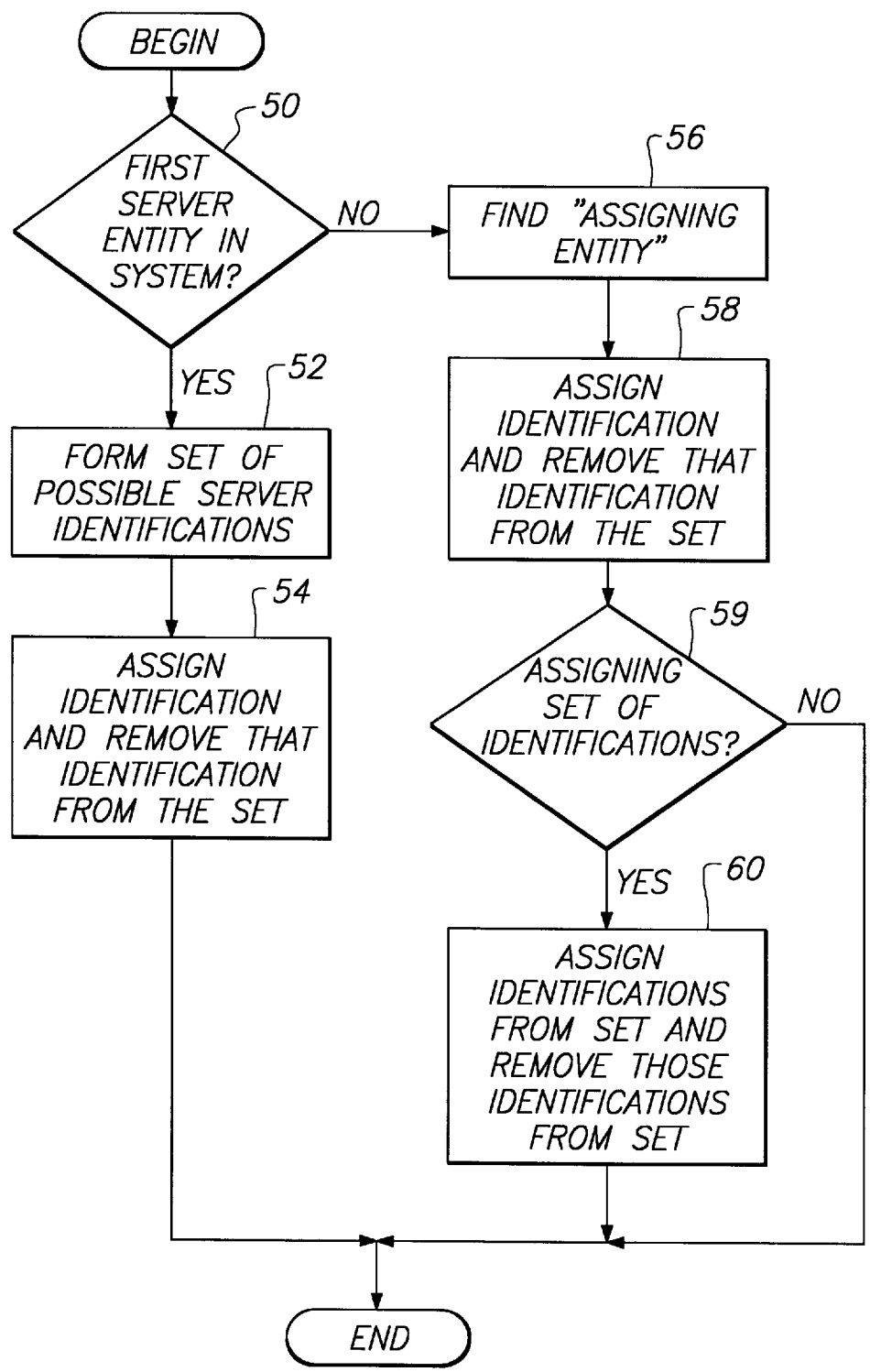
FIG. 3 is a flowchart showing generally the steps performed to generate unique server entity identifications in a network of computer systems incorporating a first embodiment of the invention.

FIG. 3 is a flowchart showing conceptually the steps generally performed to generate unique server entity identifications in a system incorporating the first embodiment of the invention. The steps in FIG. 3 are performed in response to a request or other action initiating an installation of a server entity onto the network.

At decision block 50 in FIG. 3, it is determined whether the server entity being installed, herein called the "new server entity", is the first server entity to be installed on the network system. If it is the first server entity, then at block 52, the new server entity determines/forms/delineates the possible unique server identifications in the network system. These available and as-of-yet-unassigned unique server identifications are collectively referred to herein as the "set of available server identifications" or as the "available server identifications". There are various methods for implementing this step, however, the advantages of the invention are not dependent upon any specific implementation. Some possible implementations of the step 52 are described later in the detailed description.

At block 54 the new server entity assigns to itself an available server identification and removes that assigned server identification from its set of available server identifications. Many methods can be used to remove the assigned server identification from the available server identifications. The actual method used depends upon the implementation used at block 52. For example, if a list of available server identifications is maintained in a linked list, then the node associated with the assigned server identification is removed from the linked list. Similarly, if the list of available server identifications is maintained as a range of contiguous numbers with specified minimum or maximum values for that range, then the minimum or the maximum value of the range is updated accordingly, depending on which of the two values was assigned. For example, if the minimum value is issued as the assigned server identification, then the minimum value is incremented so that the same value is not reused. At block 54 any mechanism can be employed which delineates in some manner that the assigned identification is no longer available to be assigned to other server entities.

If at decision block 50 the new server entity is not the first server entity to be installed on the network, then at block 56 the new server entity finds or otherwise identifies a previously-installed server entity, called herein an "assigning server entity", which is capable of assigning a server identification to the new server entity. Typically, an assigning server is located by using a protocol which includes broadcasting messages to the other servers on the network. Generally, a message is broadcast asking the other servers to respond if they are an assigning server. The responding servers are then queried as to which catalogs they serve. The information is usually compiled and stored in non-volatile memory.

Alternatively, rather than having the new server broadcast a message to determine an assigning server, an administrator can indicate an assigning server to the new server entity. In other words, the administrator can specify the identity of the assigning server from which the new server can request identifications.

Alternatively, rather than using an administrator or broadcasting a message to all of the other servers, distributed partial lists of available servers can be used. Essentially each server entity maintains of list of other server entities it "knows" which are assigning entities. The new server then uses a network protocol to find a server with at least one assigning server in its list. It then uses the information from that server's list to identify an assigning server for itself. Optionally, the new server incorporates the information in the list of the found server into its own list.

The advantages of the invention do not depend upon the actual method used to identify an assigning server. Other methods, besides those described herein, may also be used.

At block 58 the assigning entity assigns a unique server identification to the new entity and removes the assigned server identification from its set of available server identifications. The methods used in blocks 54 and 58 are preferably the same or similar.

If the new server entity desires a set of available server identifications for itself so that it can act as an assigning server to subsequently-installed servers, then at block 60, a set of available server identifications is assigned to the new server entity. The set of available server identifications can come from the assigning server entity used at block 58 or from a different server entity with the capacity to assign a set of available identifications. Various methods can be used to determine which unique identifications to include in the assigned set. These methods are discussed later.

An installed server entity may at virtually any time request a set of unique server identifications from an appropriate other server entity. Thus, a server entity may perform many other operations between being installed and requesting a set of server identifications. Issuing a request for a set of server identifications is optional. In fact, some server entities might not ever issue a request for a set of server identifications.

As previously mentioned, the step at block 52 can be performed in a variety of ways. For example, the first new server entity may define a range of available (as-of-yet unassigned identifications) by specifying the identification at the beginning of the range and the identification at the end of the range. The range of identifications can thereafter be subdivided and assigned using appropriate mathematical formulas.

Preferably, the identifications are divided into contiguous partitions or lists of contiguous partitions.

Various methods can be used at blocks 54 and 58 to determine which identification to assign from the range of available identifications. For example, start at lowest end of range and increment by an amount or start at highest end of range and decrement by an amount. Preferably, when identifications have an integer format, a fixed amount of 1 is used to increment or decrement, so that numbers are not wasted. Identifications can have a format other than integer. For example, identifications can have an alphanumeric format.

Various methods can be used at block 60 to determine which identifications to assign as a set. As previously stated, these sets preferably contain consecutive identifications. The number of identifications to include in a set can be determined in a variety of ways. For example, the number of identifications to include can be a fixed percentage of the unique identifications owned by that server entity. Alternatively, the number of identifications to include may be a fixed number. Alternatively, a system can include a protocol whereby the new server entity requests a specific number of identifications.

Figure 4:
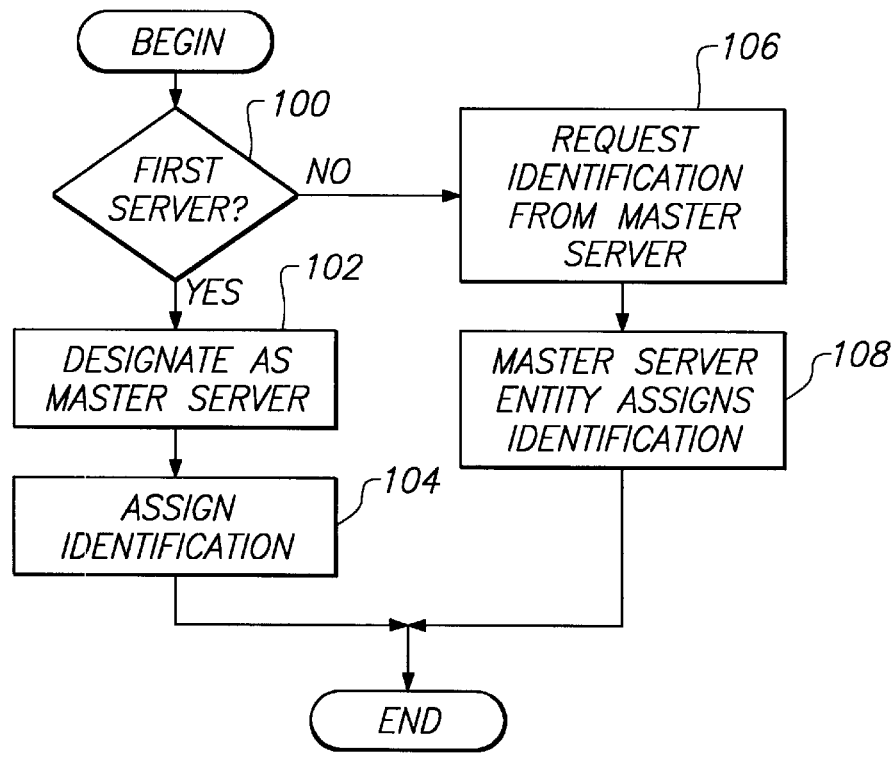
FIG. 4 is a flowchart showing generally the steps performed to generate unique server entity identifications in a network of computer systems incorporating a second embodiment of the invention.

FIG. 4 is a flowchart showing conceptually the steps generally performed to generate unique server entity identifications in a system incorporating the second embodiment of the invention. The steps in FIG. 4 are performed in response to a request or other action initiating an installation of a new server entity onto the network.

At decision block 100, as at block 50 of FIG. 3, it is determined whether the new server entity is the first server entity to be installed at the network. If it is the first, then at block 102, the new server is made the master server entity by forming the range or set of available unique server identifications for the system. The steps performed at block 102 are similar to those performed at block 52 of FIG. 3.

At block 104, as at block 54 of FIG. 3, the new server entity assigns itself an available unique server identification and removes that assigned identification from the set of available server identifications or otherwise indicates or ensures that the assigned identification can not be assigned to another server entity.

In a preferable implementation at blocks 102 and 104 an initial unique server identification, e.g. 1, is assigned to the master server entity. This initial server identification is then incremented, e.g. by 1, and the value is stored in non-volatile memory and referenced appropriately, e.g. as the "next_server_identification". For convenience, labels for storage locations have names containing a "_" symbol.

If at decision block 100, the new server entity is not the first server entity to be installed on the network, then at block 106, the new server entity requests a unique server identification from the master server entity. If the new server entity does not "know' the identity of the master server entity, it typically broadcasts a query to other server entities asking each whether it is the master server entity. The identity of the server entity which indicates that it is the master server entity is stored as such in non-volatile memory for future reference. If no server entity identifies itself as the master server entity, then error handling routines are invoked, as discussed below in more detail. It would be obvious to a person of ordinary skill in the art that any one of a variety of protocols may be used to ascertain the identity of the master server entity without affecting the overall benefits of the invention. At block 108, the master server entity assigns a unique identification from its set of available server identifications and removes the assigned identification from the set.

Preferably, at block 108, the master server entity assigns the value of the next_server_identification to the new server entity and increments, or otherwise updates, the value of the next_server_identification.

The designation of master server entity may be transferred from one server entity to another. Thus, although FIG. 4 describes the master server entity as the first server entity to be installed, the invention permits the designation of master server entity to be transferred to another server entity by issuing appropriate commands or protocols to notify a current master server entity that it will no longer be a master server entity. Upon receipt of such notification, that current master server entity stops issuing server entity identifications. The new master server entity is appropriately notified. It determines the next server entity identification to issue. Preferably, the new master server entity updates the next server entity identification to issue by a substantial increase to avoid reissuing server entity identifications if the original master server entity was unavailable during the transfer, or if the new master server entity was uninformed of recent changes to the next server entity identification. The size of the substantial increase is preferably chosen to be many times larger than the maximum expected number of server entity identifications for which there might not have been accounting.

Figure 5:
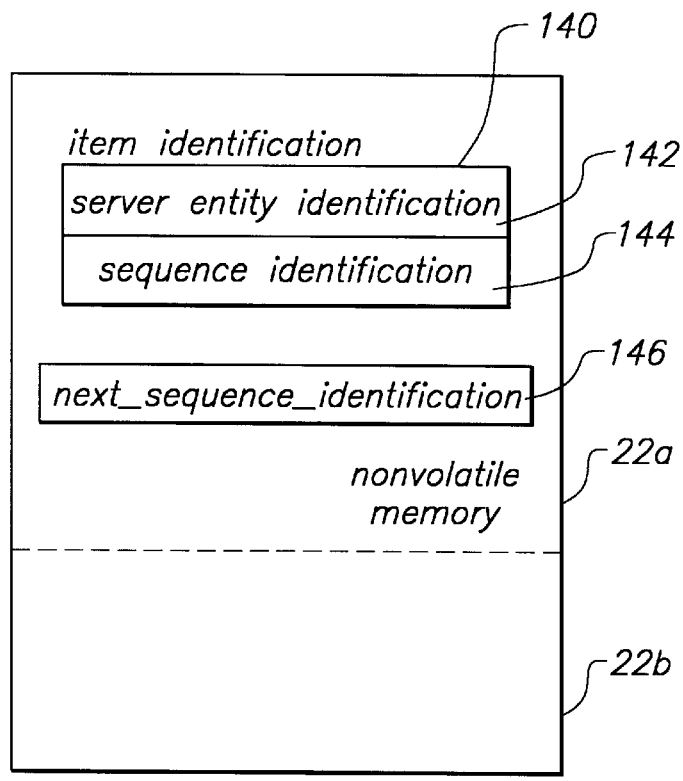
FIG. 5 illustrates a structure for an item identification in the context of a server entity that produces item identifications in a network of computer systems incorporating the invention.

FIG. 5 illustrates generally the structure of an item identification 140 in a system incorporating the invention and the typical contents of a nonvolatile memory 22a for a network server entity capable of assigning item identifications. This structure can be used for the first or second embodiments of the inventions described in FIGS. 3 and 4, respectively, as well as in other embodiments of the invention. The item identification 140 is typically stored in nonvolatile memory 22a (FIG. 2).

The item identification 140 uniquely identifies items within a database. For example, in a database system like PCS which is based on catalogs, as previously described, a item identification uniquely distinguishes an item from the other items in the catalog.

The item identification 140 comprises a first identification portion 142, also called a server entity identification, and a second identification portion 144, also called a sequence identification. The server entity identification uniquely distinguishes the server entity from other server entities on the network. The generation of the server entity identification 142 is described in conjunction with FIGS. 3 and 4.

The sequence identification 144 is a unique identification generated by a particular server entity. It distinguishes an item such as a record or attribute from other items given an identification by that server entity. In a PCS system, if a catalog is served by a single server entity, then the sequence identification 144 is unique within the context of that server entity. However, if the catalog is served by two or more server entities, then the sequence identification is not necessarily unique within the catalog. Thus, where there is a plurality of server entities for a catalog, it is the combination of the server entity identification and the sequence identification which uniquely distinguishes an item from other items in that catalog.

Preferably, the entity server identification 142 and the sequence identification 144 are each an integer in the range 1 through $2^{32}-1$, inclusive.

Memory 22a further includes a next_sequence_identification 146 for indicating the sequence identification to be assigned to the next item which requests, explicitly or implicitly, an item identification 140. In some systems, an item identification 140 is implicitly requested by a command to create an item.

Figure 6:
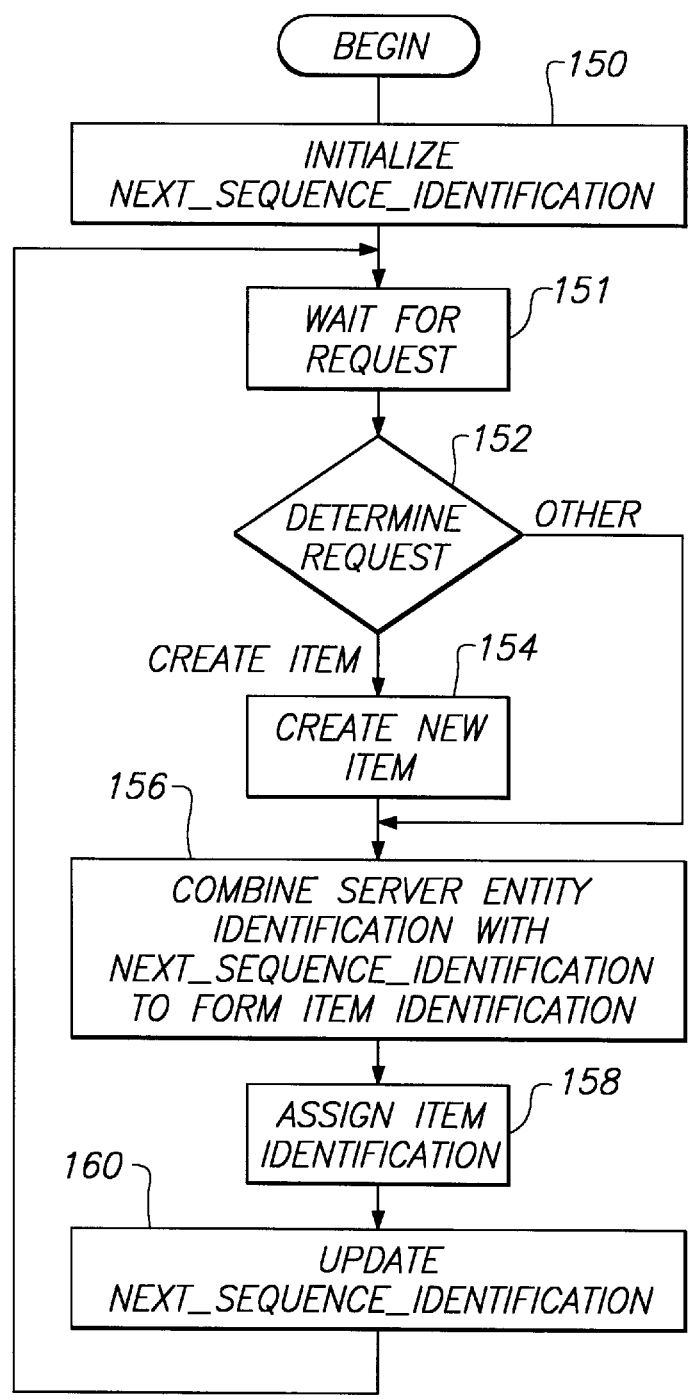
FIG. 6 is a flowchart showing generally the steps performed by an entity to generate unique item identifications in a network of computer systems incorporating the invention.

FIG. 6 is a flowchart showing generally the steps performed by a server entity to generate unique item identifications in a system incorporating the invention. It is used in conjunction with any method for generating unique server identifications, preferably those shown in FIGS. 3 or 4.

At block 150, a server entity initializes a data structure, herein called "next_sequence_identification", to the value of a first sequence identification. For example, the next_sequence_identification can be initialized to 1, or any other initial value, depending on the implementation. Block 150 is typically performed at a time around when the server entity receives a unique server identification (FIGS. 3 or 4).

The rest of the steps in FIG. 6 are typically performed in response to a request either to create a new item, such as a record or attribute, or to assign a unique item identification to an existing item. The server receiving the request is herein called the "assigning server entity". At decision block 152, it is determined which type of request has been issued. If the request is to create a new item, then at block 154 the new item is created and control continues to block 156. If at block 152, it is determined that the request is to issue a unique identification to an existing item then control passes to block 156. In either case, the item which will be assigned the unique identification is herein called the "receiving item".

At block 156, the server entity identification of the assigning server entity is combined with the value of the next_sequence_identification to form a unique item identification. At block 158, the item identification is assigned to the appropriate receiving item and at block 160 the next_sequence_identification value is updated.

Figure 7:
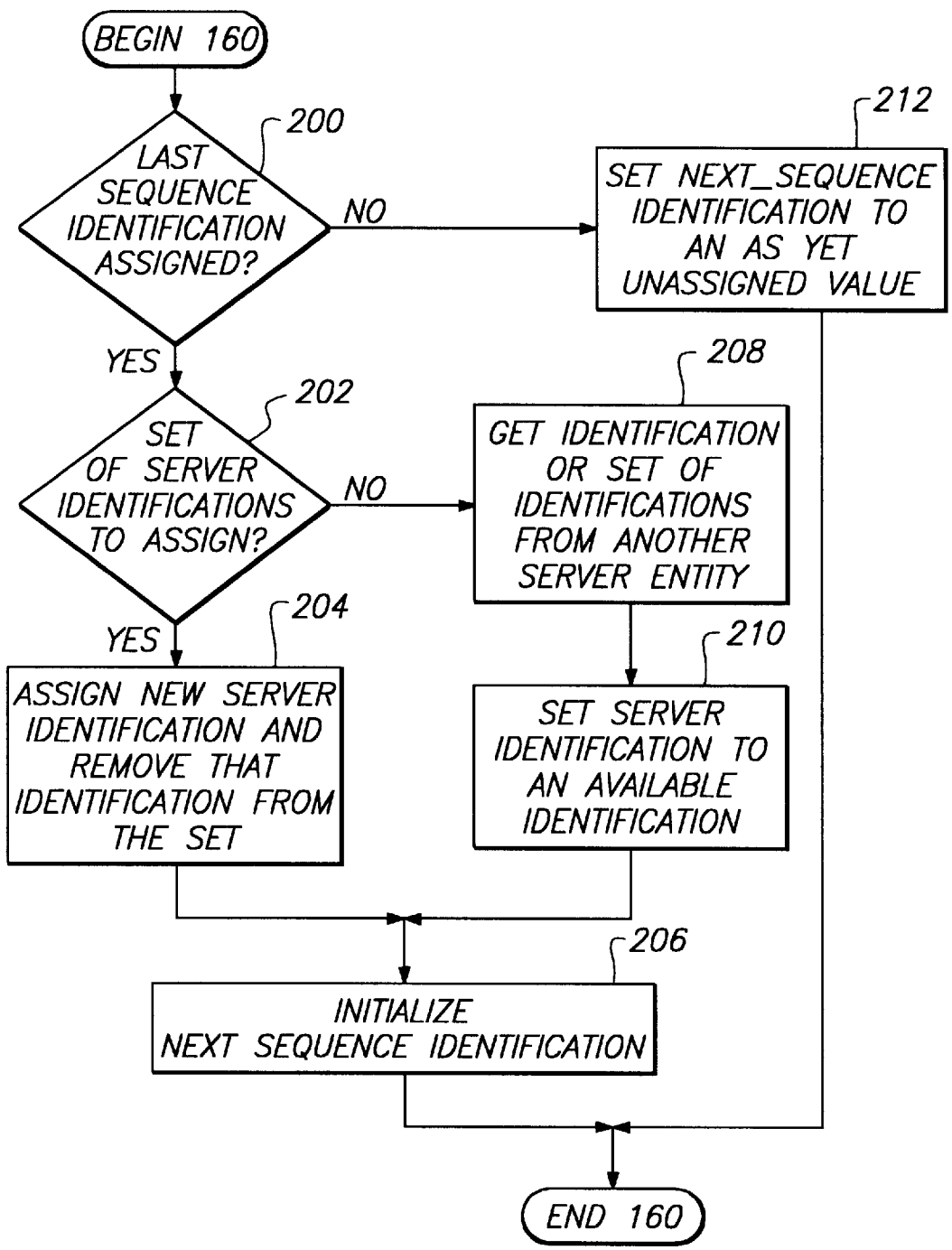
FIG. 7 is a flowchart conceptually illustrating the steps performed at block 160 of FIG. 6 in a first embodiment of the invention shown in FIG. 3.

FIG. 7 is a flowchart conceptually showing the steps generally performed at block 160 of FIG. 6 in a first embodiment of the invention shown in FIG. 3. At decision block 200 it is determined whether the last potentially assignable sequence identification was assigned at block 158 of FIG. 6.

Typically, there is a finite number of potentially assignable sequence identifications, depending on the size of the next_sequence_identification data structure or the amount of non-volatile memory space reserved for such use. A determination that the last potentially assignable sequence identification was assigned does not necessarily mean that each and every possible sequence identification was used, although in a preferable embodiment, an attempt is made to not waste sequence identifications.

For example, in a preferred implementation, sequence numbers range from 1 to $2^{32}-1$, assuming that the length of a sequence identification 144 (FIG. 5) is 32 bits. The next_sequence_identification is initialized to 1 and then incremented by 1 after each assignment of a sequence identification to an item. In this case, the assignment of the value $2^{32}-1$ indicates that there are no more assignable sequence identifications for the server entity's identification. Of course, a similar method can be applied to sequence identifications 144 having other lengths.

Other methods for updating the next_sequence_identification can be used as well. For example, the next_sequence_identification can be updated incrementing by an integer other than 1. Or the next_sequence_identification can be initialized to the highest possible value and then decremented until it reaches 1. The invention can also operate on any set of uniquely identifiable numbers or characters.

When there are no more potentially assignable sequence identifications, the server entity receives a new server entity identification, either from itself if one is available, or from another server entity. At block 202 it is determined whether the assigning server entity has an available server entity identification to assign to itself. If it does, then at block 204, it assigns to itself a new server entity identification and removes that assigned id from its set of available server entity identifications. This is similar to blocks 54 (FIG. 3) and blocks 104 (FIG. 4). At block 206, the next_sequence_identification is initialized as in block 150 of FIG. 6.

If at block 202 the server entity does not have an available server entity identification to assign to itself, then at block 208 it receives a new server entity identification or set thereof from another server entity, as in block 60 of FIG. 3. At block 210, the server entity identification of the server entity is set to an available server entity identification received at block 208. At block 206, the next_sequence_identification is initialized, as in block 150 of FIG. 6.

If at block 200, there are more potentially assignable sequence numbers, then at block 212, the next_sequence_identification is set to an available, e.g. unassigned, sequence number. As previously discussed, the next_sequence_identification is preferably initialized to the lowest possible value and then updated by incrementing it by the smallest incremental amount depending upon its data type, e.g. if it is an integer, then it is incremented by 1.

Figure 8:
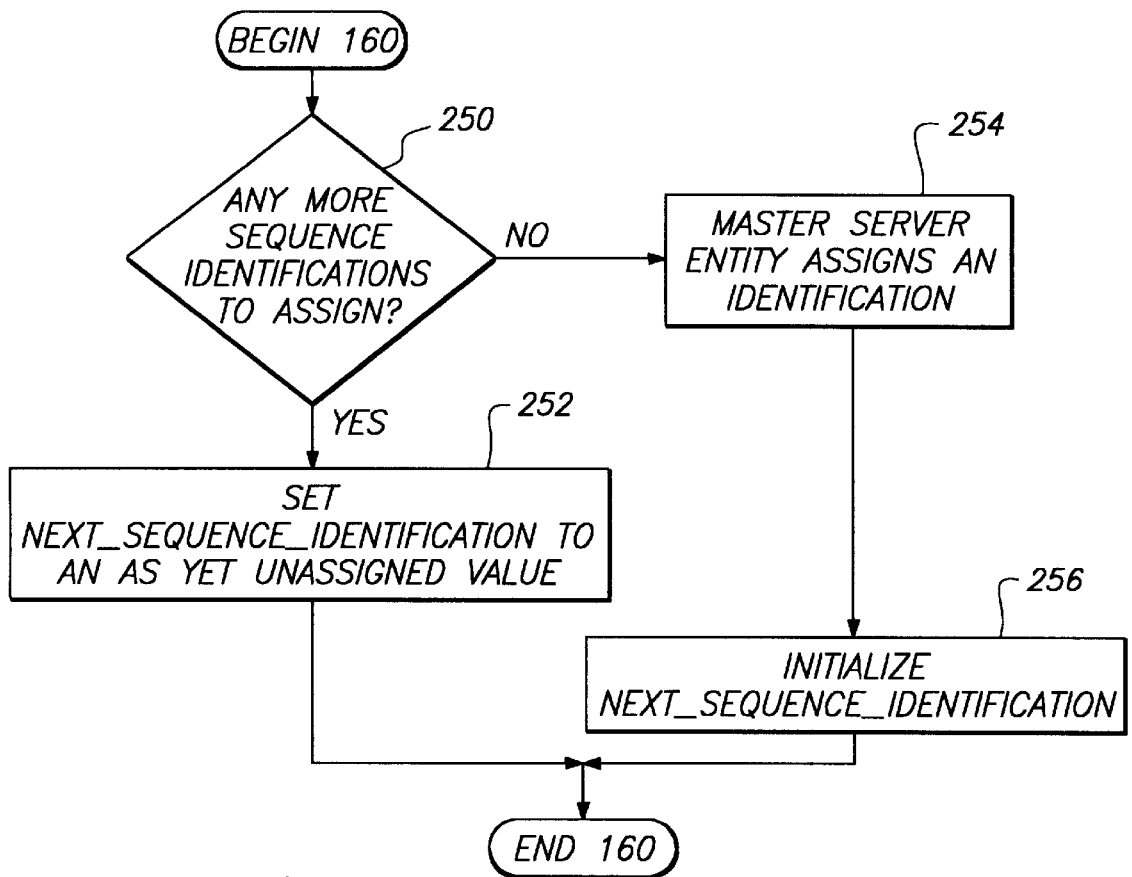
FIG. 8 is a flowchart conceptually illustrating the steps performed at block 160 of FIG. 6 in a second embodiment of the invention shown in FIG. 4.

FIG. 8 is a flowchart conceptually showing the steps generally performed at block 160 of FIG. 6 in a second embodiment of the invention shown in FIG. 4. At decision block 250, as at block 200 of FIG. 7, it is determined whether there are any potentially assignable sequence identifications available. If so, then at block 252, the next_sequence_identification is set to an available, e.g. unassigned, sequence identification, as previously described in conjunction with block 212 of FIG. 7. At decision block 250, if there are no more potentially assignable sequence identifications, then at block 254, the server entity requests and receives a new server entity identification from the master server entity, as in blocks 106 and 108 of FIG. 4. Then at block 256, the next_sequence_identification is initialized, as in block 150 of FIG. 6 and block 206 of FIG. 7.

Figure 9:
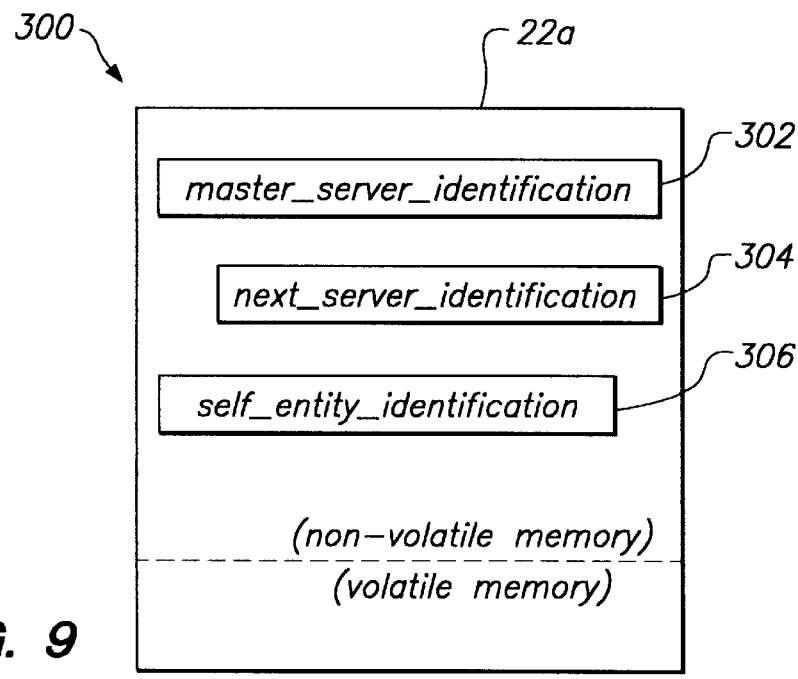
FIG. 9 conceptually describes the contents of non-volatile memory of FIG. 2 in a master server entity in a system incorporating a second embodiment of the invention shown in FIGS. 4, 6 and 8.

FIG. 9 shows conceptually the contents of a nonvolatile memory 22a (FIG. 2) in a master server entity 300 in a system 10 (FIG. 1) incorporating the second embodiment of the invention shown in FIGS. 4, 6 and 8. The nonvolatile memory 22a of a master server entity typically includes a master_server_identification 302, a next_server_identification 304 and a self_entity_identification 306.

Preferably, the master_server_identification 302 identifies which server entity in the network is the master_server_entity. The master_server_identification 302 can be used to determine whether a particular machine is a master server and if it is not a master server, then to quickly determine which machine is the master server entity.

Alternatively, rather than having the master_server_identification 302 identify which server is the master server, the identification 302 could simply indicate whether that particular server entity is the master server entity. For example, the master_server_identification could be a one bit field which is set to TRUE on the master server entity and set to FALSE on the other server entities. In that case, a server entity checks the value of the master_server_identification to quickly determine whether it is the master server entity. However, this method does not indicate which server entity is the master server entity.

The invention further provides error recovery methods when attempts to determine which server entity is the master server entity are not successful. For example, where the master_server_identification is a one bit field, error recovery methods are used when the master_server_identification is false on each of the server entities connected to the network. Alternatively, rather than using the error recovery methods, the system could be restored from backup. The error recovery methods are described in more detail below.

The next_server_identification 304 indicates an identification to be assigned to the next server entity which requests an identification from the master server entity.

The self_entity_identification 306 uniquely identifies the server itself. It can be, for example, a server entity identification 142 as shown in FIG. 5 or it can be some other identification such as the name of the machine. Preferably, it is the same form as the master_server_identification 302 so that the values of the two fields 302 and 306 can be compared to determine whether a particular machine is a master server entity.

FIGS. 10–13 illustrate the operation of a system incorporating the second embodiment of the invention shown in FIGS. 4, 6 and 8. FIGS. 10–13 show a network system 10 (FIG. 1) including four network server entities 12 (FIGS. 1 and 2). For descriptive purposes, the network entities are referred to herein as machine_1 12a, machine_2 12b, machine_3 12c, and machine_4 12d.

Figure 10:
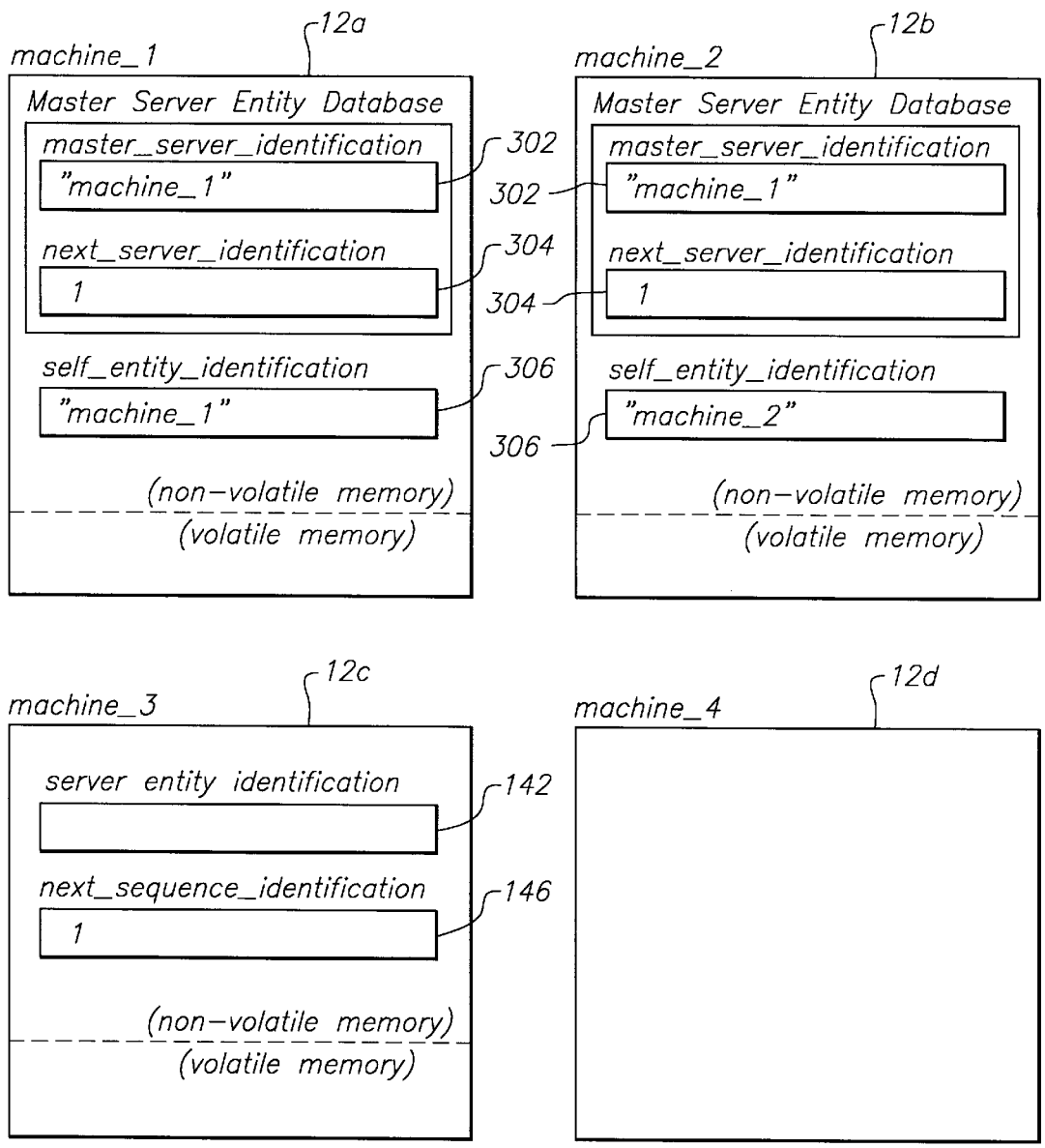
FIG. 10 illustrates generally a configuration of machines which support the generation and use of item identifications shown in FIG. 5.

FIG. 10 shows a configuration of machines which support the generation and use of item identifications 140. In this illustration, machine_1 12a is the master server entity. Machine_2 is a server entity which maintains a copy of the database of the master server entity. The master server entity's database typically includes master_server_identification 302 and next_server_identification 304. Machine_2 can not issue server entity identifications because it is not the master server entity. However, machine_2 can be made the master server entity at any point in time. If machine_2 is made the master server entity, it can use its copy of the master server database to take over the process of issuing server entity identifications. In this illustration, machine_3 is an issuer of unique item identifications 140 (FIG. 5) and machine_4 is a requester of a unique item identification.

Figure 11:
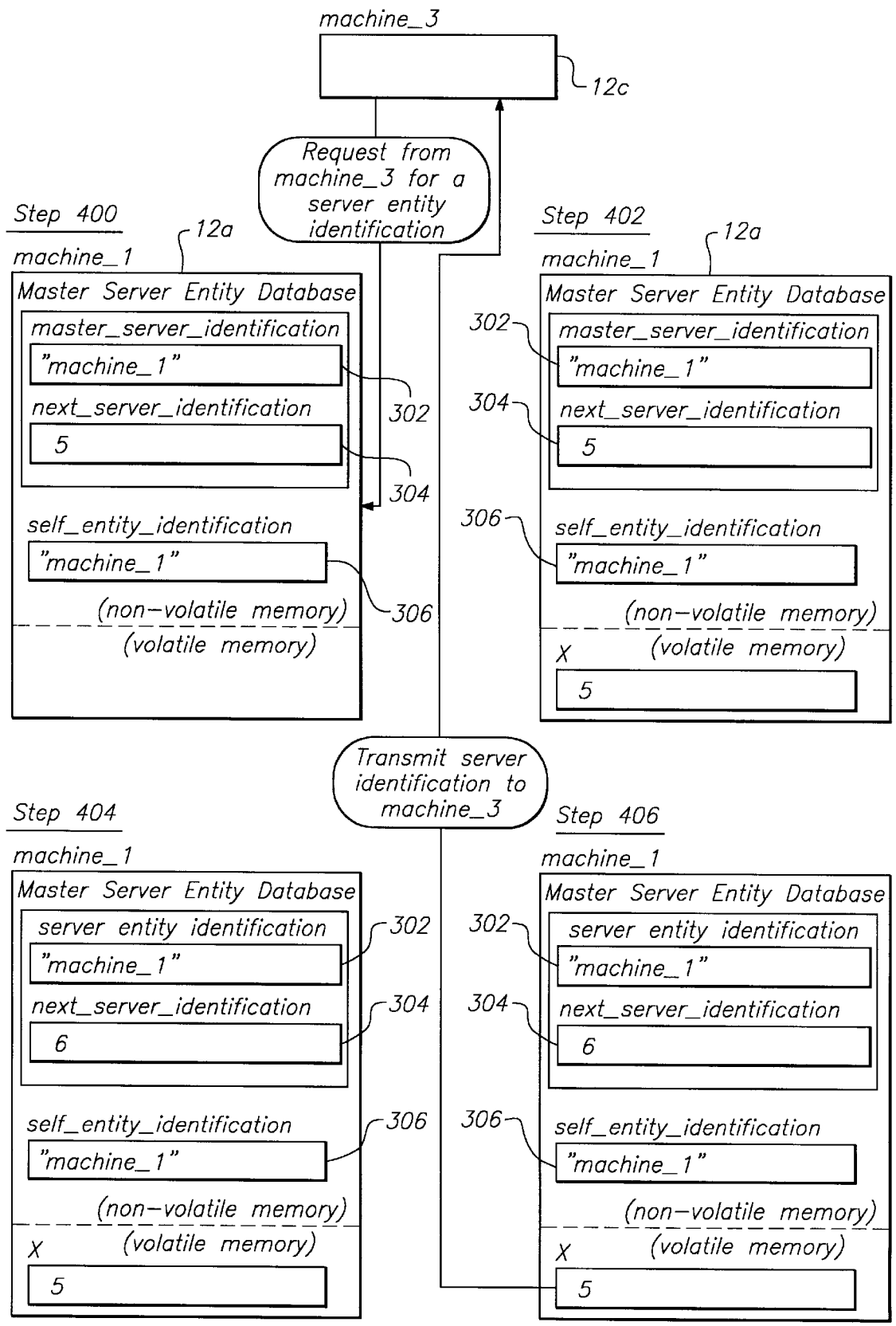
FIG. 11 illustrates generally the process by which a master server entity issues a server entity identification to a server entity.

FIG. 11 illustrates the process by which a master server entity, in this case machine_1 12a, issues a server entity identification to a server entity, machine_3. At step 400, machine_3 12c requests a server entity identification from machine_1. At the time it receives this request, machine_1 has a master_server_identification and a self_entity_identification which indicate that it is the master server. It also has a next_server_identification with a value of 5, indicating that the next server entity identification to be assigned is 5.

At step 402, machine_1 has computed the value of the server entity identification that it will issue to machine_3 and has stored that value in a memory location denoted as X. At step 404, machine_1 updates the value of the next_server_identification, in this case, by adding 1. At step 406, machine_1 issues the value stored at X as a server entity identification to machine_3. To protect against loss of identifications during a crash of the machine_1 the server entity identification is not issued until after the next_server_identification is incremented. To accomplish this, before incrementing the next_server_identification, its value is temporarily stored in another storage location. After the next_server identification is incremented, the value temporarily stored is issued as a server entity identification.

As previously mentioned, a system incorporating the second embodiment of the invention also provides means for transferring the responsibilities of the generating and issuing unique server identifications from one server to another server. Preferably, the following steps occur to change the designation of master server entity. The master server entity is notified that it is no longer the master server entity. This notification is sent by the initiator of the transfer, typically a network management application (not shown) or the server entity to which master server entity responsibilities are being transferred. In response to this notification, the "former" master server entity stops issuing server identifications and updates its master_server_identification field to indicate that it is no longer the master server entity. If the transfer is not initiated by the server entity to which master server entity responsibilities are being transferred, then the initiator of the transfer notifies that server entity that it is the master server entity.

The new master server entity updates its master_server_identification field 302 to identify itself as the master server entity. It also reads the value of the next_server_identification 304 and preferably adds a relatively large number to it and stores that sum in the next_server_identification field. The purpose of increasing the value of the next_server_identification 304 is to avoid reissuing server identifications if the former master server entity was unavailable during the transfer or if the new master server entity is "unaware" of recent activity of the former master server entity. The size of the increase is preferably chosen to be many times larger than the maximum expected number of server identifications which might have been unaccounted for. Since server identifications are issued relatively infrequently, the increase typically does not significantly erode the available number space.

For example, with reference to FIG. 10, to make machine_3 rather than machine_1 master server entity, the following steps preferably occur. Machine_1 is notified that it is no longer master server entity and, in response, machine_1 stops issuing server entity identifications and updates its master_server_identification to indicate that it is no longer the master server entity. Machine_3, if it is not the initiator, is notified that it is the new master server entity. Machine_3 then updates the master_server_identification to indicate that it is the master server entity and then increments the value specified by next_server_identification by an amount which increases the likelihood that the new master server entity will not issue a server identification which was already issued by a former master server entity.

Figure 12:
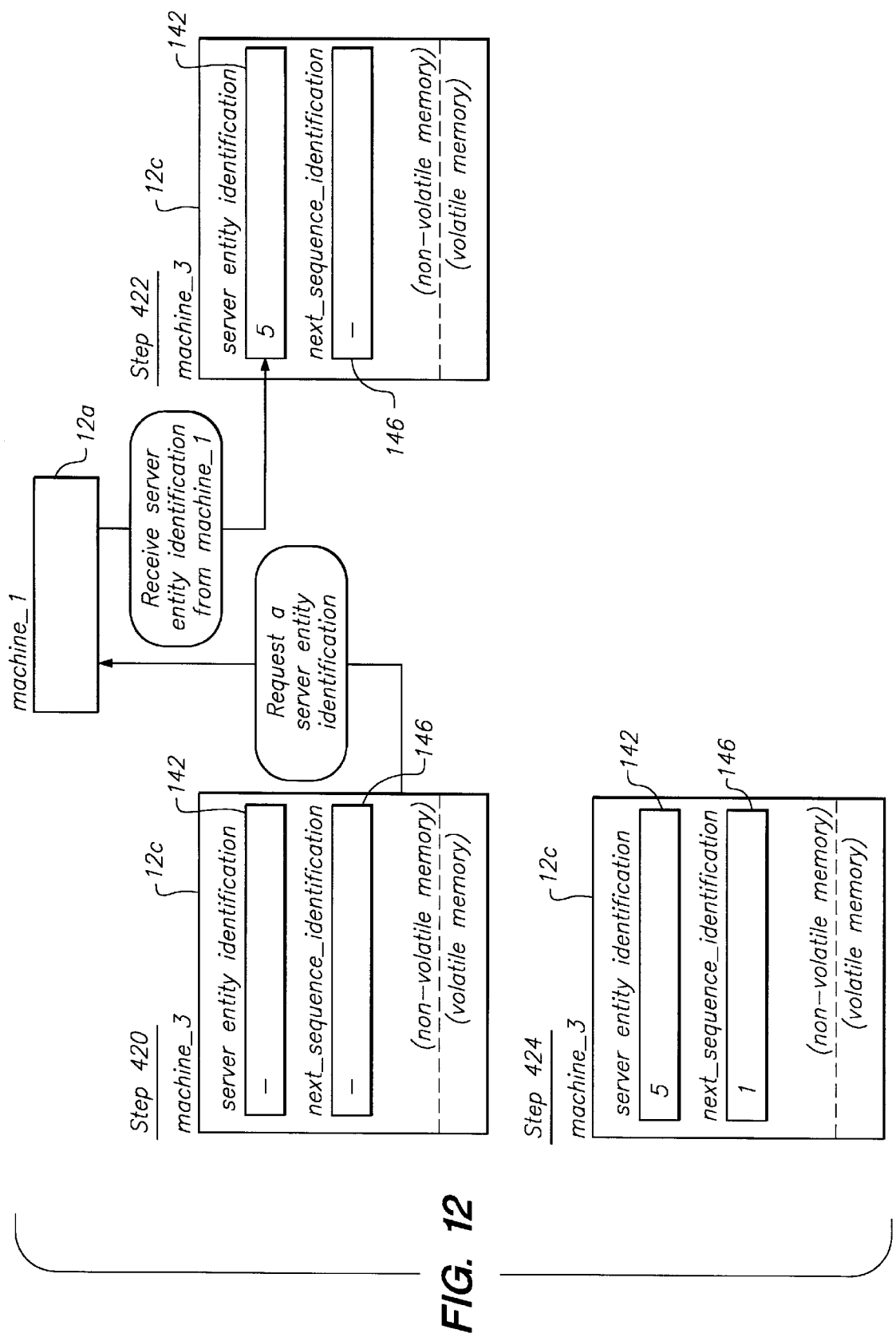
FIG. 12 generally shows the process by which a server entity prepares to issue item identifications.

FIG. 12 illustrates the process by which a server entity, in this case machine_3 12c, prepares to issue item identifications. This process is typically preferred by servers which generate a substantial amount of item identifications. At step 420, machine_3 is not prepared to issue item identifications 140 because it lacks a server entity identification. Thus, machine_3 requests a server entity identification from the master server entity, machine_1. As discussed previously, one of a variety of methods can be used to determine that machine_1 is the master server entity.

At step 422, machine_3 receives a server entity identification, in this case a value of 5, from the master server entity, herein machine_1 and saves that value in non-volatile memory location server entity identification 142.

At step 424, machine_3 initializes the non-volatile memory location next_sequence_identification to an initial value, herein 1. Machine_3 is now prepared to fulfill requests for item identifications.

Figure 13:
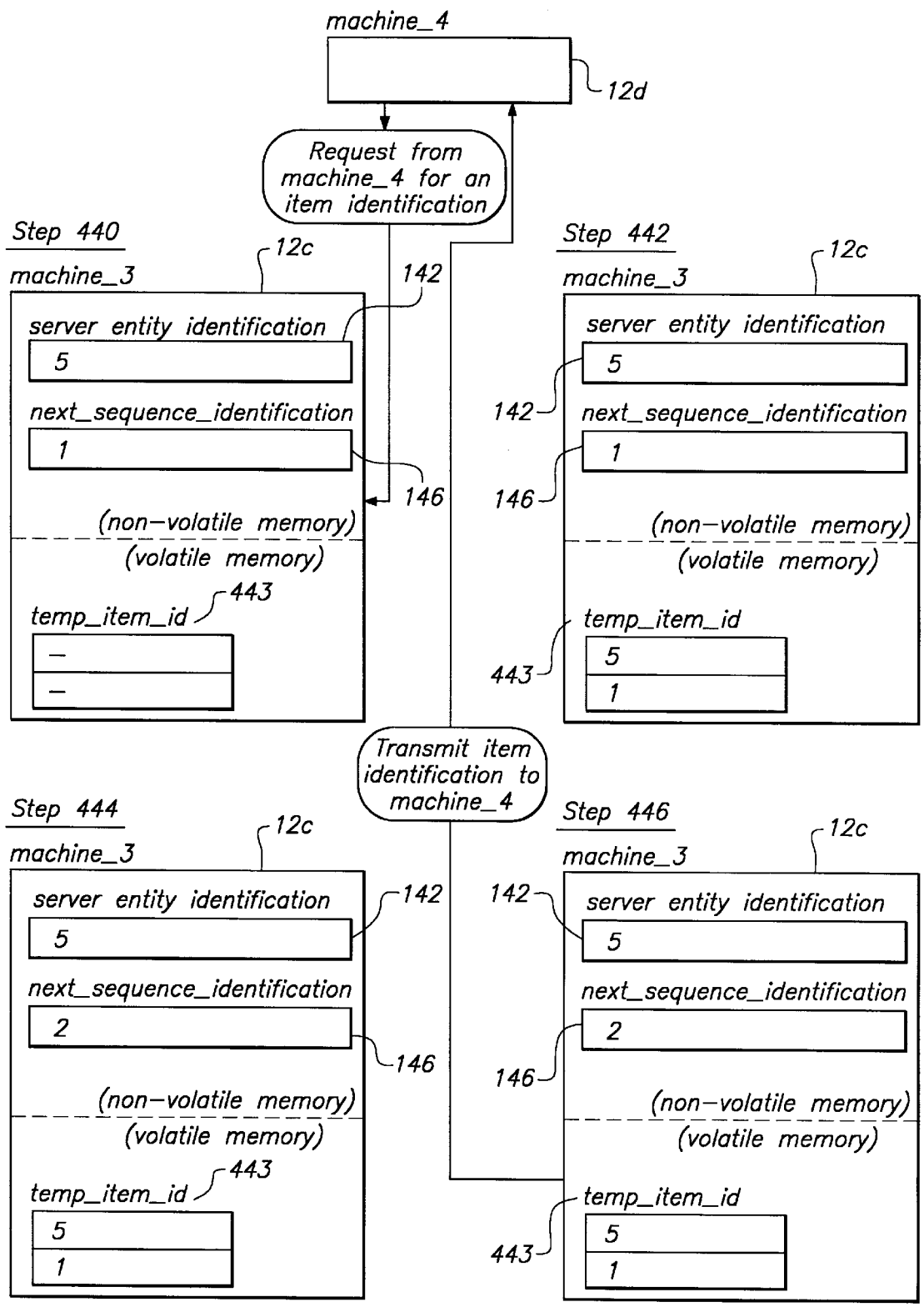
FIG. 13 generally shows the process by which a server entity generates and issues unique item identifications.

FIG. 13 illustrates the process by which a server entity, herein machine_3, generates and issues unique item identifications to another server entity which does not have its own server identification. In general, a server which does not issue a substantial amount of item identifications does not have its own server identification, but rather receives item identifications from another server which does have its own server identification.

At step 440, machine_3 is prepared to issue item identifications and receives a request from machine_4 for an item identification. At step 442, machine_3 initializes a temporary memory location in the format of an item identification, herein called temp_item_id 443, to the concatenated values of the server entity identification and the next_sequence_identification.

At step 444, machine_3 updates the value of next_sequence identification, in this case by adding 1. At step 446, machine_3 transmits to machine_4 the value of temp_item_id 443, thereby assigning that value as an item identification to machine_4.

Optionally, a system incorporating the invention can include means for recovering from errors. Such recovery means can be used, for example, in the embodiment of the invention shown in FIG. 4 in the following situations where a server entity can not identify a master server entity from which to receive identifications.

The actual cause of the problem is determined using an administration tool which can find the servers and control some aspects of their function.

In a first situation, the master server identification 302 (FIG. 9) is incorrect and therefore does not match any server. In the case of a one-bit master server identification, the master server identification of the master server entity is incorrectly set, e.g. FALSE rather than TRUE. In this first situation, an administrator uses an administration software/hardware tool to designate a particular server as the master server entity. The administrative tool sets the appropriate master server identifications to indicate that the particular server is the master server.

In a second situation, the self identification information of the master server entity is incorrect, so that the master server entity is unable to identify itself as being the master server entity. In this case, the proper identification is assigned to the self-entity-identification field of the master server entity. Alternatively, the master server entity can be given a new identification and then redesignated as the master server entity.

In a third situation, two or more servers indicate that they are the master server entity, because their own copies of the replicated designation of the master server entity are inconsistent. In this case, the inconsistency is typically transient, as this is a replicated database, and normal update propagation algorithms will eventually detect and correct the inconsistency. Once the inconsistency is corrected, only one machine indicates that it is the master server entity.

In a fourth situation, two or more servers indicate that they are the master server entity, because they have the same identity and that identity is the same as the designated master server entity. This situation can arise during a mishap such as reloading a second machine from a backup and keeping the original machine in service. In this case, administration tools are used to compel all but one of the machines to acquire a new identity. This situation is usually detected because of an operational failure.

The invention is useful in virtually any environment where devices cooperate to produce unique identifications.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. A method for assigning a unique identification to an entity within a network of computer systems having a plurality of entities connected by a network, each entity having a processor and memory, said method comprising the steps of:

determining whether the entity is a first entity to be identified in the network of computer systems;

if the entity is the first entity, then assigning an identification to the entity and determining a set of available identifications, the set of available identifications excluding the assigned identification; and if the entity is not the first entity, then receiving control of one or more identifications by transferring to the entity control of one or more of the identifications from another entity which has a set of one or more identifications to assign, such that the entity then controls the assignment of the transferred one or more of the identifications, assigning an identification to the entity, and removing the assigned identification from the set of identifications which included that assigned identification.

2. A method as defined in claim 1 wherein if the entity is the first entity, the step of assigning an available identification to the entity is performed after the step of determining a set of available identifications, the assigned identification being selected from the set of available identifications and being removed from the set after it is assigned.

3. A method as defined in claim 1 wherein the step of transferring control of one or more identifications is performed a plurality of times while the entity is connected to the network.

4. A method as defined in claim 1 further including the step of specifying on a transfer by transfer basis the number of identifications being transferred.

5. A method as defined in claim 1 wherein a fixed number of identifications are transferred.

6. A method as defined in claim 1 wherein the number of one or more identifications transferred is based upon a percentage of the number of identifications controlled by the another entity.

7. A method for assigning a unique identification to an entity within a network of computer systems having a plurality of entities interconnected by a network, each entity having a processor and memory, said method comprising the steps of:

determining whether the entity is a first entity to be identified in the network of computer systems;

if the entity is the first entity, then
      delineating that server entity as the master entity,
      assigning an initial identification to the entity, and
      determining an assignable identification to assign to the next entity which requests an identification, the assignable identification being unique in that it has yet to be assigned to an entity within the network of computer systems; and if the entity is not the first entity, then
      locating a master entity,
      assigning an assignable identification from the master entity to the entity, and
      updating the assignable identification on the master entity so that the assignable identification is unique in that it has yet to be assigned to an entity within the network of computer systems.

8. A method as in claim 7 further comprising the step of transferring the delineation of master entity from a first entity to a second entity, the step of transferring the delineation of master entity being performed without issuing of unique identifications.

9. A method as in claim 7 wherein said first entity is assigned an identification having an integer value, the assignable identification is initialized by adding 1 to the identification assigned to the first entity and the assignable identification is updated by incrementing its value by 1.

10. A method for assigning item identification to items in a database on a networked computer system, said method comprising the steps of:

assigning an identification to an entity;

initializing a storage location to a first sequence identification; and in response to a request to create an item or assign an item identification to an existing item in a database utilized by the entity, generating an item identification by combining the identification assigned to the entity with the contents of the storage location, assigning the item identification to the item identified in the request, and updating the contents of the storage location to a sequence identification which is unique from the sequence identifications previously used in conjunction with the identification; and wherein the step of assigning an identification comprises the following steps:

determining whether the entity is a first entity to be identified in the network of computer systems;

if the entity is the first entity, then
       delineating that entity as the master entity,
       assigning an initial identification to the entity, and
       determining an assignable identification to assign to the next entity which requests an identification, the assignable identification being unique in that it has yet to be assigned to an entity within the network of computer systems; and if the server entity is not the first entity, then
       locating the master entity,
       assigning the assignable identification from the master entity to the entity, and
       updating the assignable identification on the master entity so that the assignable identification is unique in that it has yet to be assigned to an entity within the network of computer systems.

11. A method as defined in claim 10 wherein the step of assigning an identification to an entity is performed a plurality of times so that each entity within a plurality of entities is assigned one or more identifications.

12. An item identification for uniquely identifying a particular item in a database in a network of computer systems having one or more entities connected by a network, each entity having a processor and memory, the item identification comprising:

an identification for identifying a particular server entity, said identification being stored in memory and being formed by
       determining whether the entity is a first entity to be identified in the network of computer systems;
       if the entity is the first entity, then assigning an identification to the entity, and determining a set of available identifications, the set including assignable identifications, excluding the initial identification; and if the entity is not the first entity, then receiving control of one or more identifications by transferring to the entity control of one or more of the identifications from another entity which has a set of one or more identifications to assign, such that the entity then controls the assignment of the transferred one or more of the identifications, assigning an identification to the entity, and removing the assigned identification from the set of identifications which included that assigned identification; and a sequence identification for identifying data served by the particular server entity, said sequence identification being stored in memory.

13. An item identification as defined in claim 12 wherein if the entity is the first entity, the step of assigning an available identification to the entity is performed after the step of determining a set of available identifications, the assigned identification being selected from the set of available identifications and being removed from the set after it is assigned.

14. An item identification as defined in claim 12 wherein the sequence identification is concatenated to the identification so that the sequence identification follows the identification.

15. A computer-readable medium having stored thereon instructions for causing a computer to perform the following steps:

determining whether the entity is a first entity to be identified in the network of computer systems;

if the entity is the first entity, then assigning an identification to the entity and determining a set of available identifications, the set of available identifications excluding the assigned identification; and if the entity is not the first entity, then receiving control of one or more identifications by
transferring to the entity control of one or more of the identifications from another entity which has a set of one or more identifications to assign, such that the entity then controls the assignment of the transferred one or more of the identifications,
assigning an identification to the entity, and
removing the assigned identification from the set of identifications which included that assigned identification.

16. A computer-readable medium having stored thereon instructions for causing a computer to perform the following steps:

determining whether the entity is a first entity to be identified in the network of computer systems;

if the entity is the first entity, then
delineating that server entity as the master entity,
assigning an initial identification to the entity, and
determining an assignable identification to assign to the next entity which requests an identification, the assignable identification being unique in that it has yet to be assigned to an entity within the network of computer systems; and if the entity is not the first entity, then
locating a master entity,
assigning an assignable identification from the master entity to the entity, and
updating the assignable identification on the master entity so that the assignable identification is unique in that it has yet to be assigned to an entity within the network of computer systems.

17. A computer-readable medium having stored thereon an item identification for uniquely identifying a particular item in a database in a network of computer systems having one or more entities connected by a network, each entity having a processor and memory, the item identification comprising:

an identification for identifying a particular server entity, said identification being stored in memory and being formed by
determining whether the entity is a first entity to be identified in the network of computer systems;
if the entity is the first entity, then assigning an identification to the entity, and determining a set of available identifications, the set including assignable identifications, excluding the initial identification; and
if the entity is not the first entity, then receiving control of one or more identifications by transferring to the entity control of one or more of the identifications from another entity which has a set of one or more identifications to assign, such that the entity then controls the assignment of the transferred one or more of the identifications, assigning an identification to the entity, and removing the assigned identification from the set of identifications which included that assigned identification; and a sequence identification for identifying data served by the particular server entity, said sequence identification being stored in memory.

18. An apparatus for assigning a unique identification to an entity within a network of computer systems having a plurality of entities connected by a network, each entity having a processor and memory, said apparatus comprising:

means for determining whether the entity is a first entity to be identified in the network of computer systems;

first means for assigning an identification to the entity, said assigning means arranged such that an identification is assigned when the entity is a first entity;

means for determining a set of available identifications, the set of available identifications excluding the assigned identification, said determining means being arranged such that said set of available identifications is determined when the entity is a first entity; and means for receiving control of one or more identifications, said receiving means arranged such that control of one or more identifications can be received when the entity is not a first entity, said receiving means having
means for transferring to the entity control of one or more of the identifications from another entity which has a set of one or more identifications to assign, such that the entity then controls the assignment of the transferred one or more of the identifications,
second means for assigning an identification to the entity, and
means for removing the assigned identification from the set of identifications which included that assigned identification.

\* \* \* \* \*